United States Patent
Weston et al.

(10) Patent No.: US 12,054,195 B2
(45) Date of Patent: Aug. 6, 2024

(54) OPERATION ASSISTANCE SYSTEM FOR A VEHICLE

(71) Applicant: Ford Global Technologies, LLC, Dearborn, MI (US)

(72) Inventors: Keith Weston, Canton, MI (US); Brendan F. Diamond, Grosse Pointe, MI (US); Jordan Barrett, Milford, MI (US); Andrew Denis Lewandowski, Sterling Heights, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 174 days.

(21) Appl. No.: 17/385,314

(22) Filed: Jul. 26, 2021

(65) Prior Publication Data
US 2023/0021911 A1    Jan. 26, 2023

(51) Int. Cl.
B62D 15/02    (2006.01)

(52) U.S. Cl.
CPC ............... B62D 15/0265 (2013.01)

(58) Field of Classification Search
CPC ... B62D 13/06; B62D 15/0285; B62D 15/025
See application file for complete search history.

(56) References Cited

U.S. PATENT DOCUMENTS

| | | |
|---|---|---|
| 6,280,004 B1 | 8/2001 | Greaves, Jr. |
| 6,501,376 B2 | 12/2002 | Dieckmann et al. |
| 9,592,800 B2 | 3/2017 | Matoy et al. |
| 10,185,329 B2 | 1/2019 | Giles et al. |
| 10,928,511 B2 | 2/2021 | Nasser et al. |
| 2005/0039630 A1* | 2/2005 | Kumar .............. B60K 6/46 105/35 |
| 2007/0114836 A1 | 5/2007 | Kaminski et al. |
| 2010/0152920 A1 | 6/2010 | McCann |
| 2013/0158826 A1 | 6/2013 | Cusi |
| 2017/0168503 A1 | 6/2017 | Amla et al. |
| 2018/0121742 A1* | 5/2018 | Son .............. B62D 15/021 |
| 2019/0129426 A1 | 5/2019 | Garcia |
| 2019/0217831 A1 | 7/2019 | Viele |
| 2020/0171897 A1* | 6/2020 | Xu .............. B62D 13/00 |
| 2020/0172060 A1 | 6/2020 | Decker, Jr. et al. |
| 2021/0009143 A1* | 1/2021 | Niewiadomski ...... B60W 30/09 |
| 2021/0053568 A1* | 2/2021 | Niewiadomski ......... B60D 1/36 |
| 2021/0108926 A1* | 4/2021 | Tran .............. G06T 17/05 |

(Continued)

FOREIGN PATENT DOCUMENTS

| | | | | |
|---|---|---|---|---|
| CN | 111267826 A | * | 6/2020 | ........... B60D 1/06 |
| DE | 102015112001 A1 | * | 2/2016 | ........... B60T 7/20 |

(Continued)

*Primary Examiner* — Redhwan K Mawari
(74) *Attorney, Agent, or Firm* — Vichit Chea; Price Heneveld LLP

(57) ABSTRACT

An operation assistance system for a first vehicle that is connected to a second vehicle that propels the connected first and second vehicles includes: a sensor system of the first vehicle that detects a feature in an operating environment of at least one of the first vehicle and the second vehicle; and a controller that is in communication with the sensor system and that prompts a power assist steering system of the first vehicle to execute a steering command based on the sensor system detecting the feature.

12 Claims, 9 Drawing Sheets

(56) References Cited

U.S. PATENT DOCUMENTS

| | | | | |
|---|---|---|---|---|
| 2021/0132625 A1* | 5/2021 | Gillett | ................... | G05D 1/0088 |
| 2021/0146998 A1* | 5/2021 | Niewiadomski | ..... | G06V 20/588 |
| 2021/0197852 A1* | 7/2021 | Fairfield | ......... | B60W 30/18163 |

FOREIGN PATENT DOCUMENTS

| | | | | |
|---|---|---|---|---|
| DE | 102016105261 A1 * | 9/2016 | ............. | B62D 13/06 |
| DE | 102016122301 A1 | 5/2018 | | |
| EP | 2439127 A1 * | 4/2012 | ............. | B62D 13/06 |
| GB | 2398049 A * | 8/2004 | ............. | B62D 13/06 |
| GB | 2552251 A * | 1/2018 | ............. | B62D 13/06 |
| JP | 2019026209 A * | 2/2019 | | |

\* cited by examiner

OPERATION ASSISTANCE SYSTEM FOR A VEHICLE

FIELD OF THE DISCLOSURE

The present disclosure generally relates to an operation assistance system for a vehicle. More specifically, the present disclosure relates to an operation assistance system for a first vehicle that is propelled by a second vehicle.

BACKGROUND OF THE DISCLOSURE

Vehicles are often used for towing trailers and may sometimes be used to propel other vehicles. The disclosure relates to a system for propelling vehicles in a towing configuration.

SUMMARY OF THE DISCLOSURE

According to one aspect of the present disclosure, an operation assistance system for a first vehicle that is connected to a second vehicle that propels the connected first and second vehicles includes: a sensor system of the first vehicle that detects a feature in an operating environment of at least one of the first vehicle and the second vehicle; and a controller that is in communication with the sensor system and that prompts a power assist steering system of the first vehicle to execute a steering command based on the sensor system detecting the feature.

Embodiments of the first aspect of the disclosure can include any one or a combination of the following features:
  controller prompts execution of the steering command based on the sensor system detecting the feature as the second vehicle tows the first vehicle;
  the controller prompts execution of the steering command based on the sensor system detecting the feature as the second vehicle pushes the first vehicle while reversing;
  execution of the steering command comprises steering the first vehicle toward the feature;
  the controller prompts execution of the steering command based on the sensor system detecting the feature and a turn signal input of at least one the first vehicle and the second vehicle;
  the feature is a lane boundary of a parking space, and execution of the steering command comprises steering the first vehicle away from the lane boundary;
  the first vehicle has front wheel steering and the second vehicle has front wheel steering;
  the sensor system is in communication with a controller of the second vehicle, and the controller of the second vehicle is configured to prompt a power steering system of the second vehicle to execute a steering command based on the sensor system detecting the feature;
  the controller prompts execution of the steering command based on the sensor system detecting the feature alongside of the second vehicle and ahead of the first vehicle; and
  the feature is one of a vehicle and a lane boundary.

According to another aspect of the present disclosure, a method of operating an operation assistance system of a first vehicle includes the steps of: propelling the first vehicle with a second vehicle; detecting a feature within an operating environment of at least one of the first vehicle and the second vehicle with a sensor system of the first vehicle; and controlling steering of the first vehicle with a steering system of the first vehicle based on the sensor system detecting the feature.

Embodiments of the second aspect of the disclosure can include any one or a combination of the following features:
  the step of propelling the first vehicle with a second vehicle comprises towing the first vehicle with the second vehicle;
  the step of propelling the first vehicle with the second vehicle comprises pushing the first vehicle with the second vehicle while reversing the second vehicle;
  the step of controlling steering of the first vehicle based on the sensor system detecting the feature comprises steering front wheels of the first vehicle toward the feature;
  the step of controlling steering of the first vehicle based on the sensor system detecting the feature comprises steering front wheels of the first vehicle away the feature; and
  the feature is one of a vehicle and a lane boundary.

According to yet another aspect of the present disclosure, an operation assistance system for a first vehicle with front-wheel steering that is towed by a second vehicle with front-wheel steering includes: a sensor system of the first vehicle that detects a feature in an operating environment of at least one of the first vehicle and the second vehicle; and a controller that is in communication with the sensor system and that prompts a power steering system of the first vehicle to execute a steering command based on the sensor system detecting the feature.

Embodiments of the third aspect of the disclosure can include any one or a combination of the following features:
  the sensor system of the first vehicle detects the feature along a right side of at least one of the first vehicle and the second vehicle, and execution of the steering command comprises steering the first vehicle to the right toward the feature to cause front wheels of the second vehicle to steer away from the feature;
  the sensor system is in communication with a controller of the second vehicle, and the controller of the second vehicle is configured to prompt a power steering system of the second vehicle to execute a steering command based on the sensor system detecting the feature; and
  the feature is one of a vehicle and a lane boundary.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1:
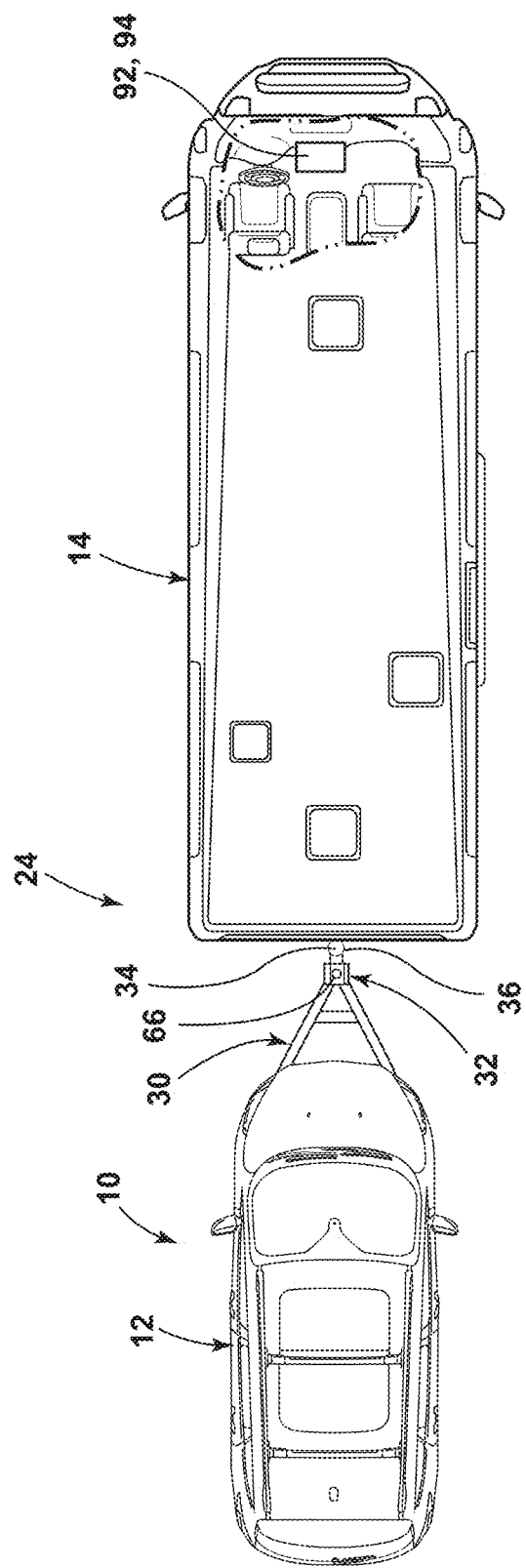
FIG. 1 is a plan view of a first vehicle coupled to a second vehicle.

In reference to FIGS. 1-9, an operation assistance system 10 for a first vehicle 12 is disclosed. The first vehicle 12 is connected to a rear side of a second vehicle 14, as illustrated in FIG. 1. The second vehicle 14 propels the first vehicle 12 in either a forward direction, via towing, or a rearward direction, via pushing. The operation assistance system 10 includes a sensor system 16 configured to detect a feature 18 (e.g., object 20, other vehicle V, lane boundary 22, pedestrian, etc.) in an operating environment 24 of at least one of the first vehicle 12 and the second vehicle 14. The operation assistance system 10 further includes a controller 26 that is in communication with the sensor system 16 and configured to prompt one or more vehicle systems to execute a vehicle action based on the sensor system 16 detecting the feature 18. For example, the controller 26 may prompt a power assist steering system 28 of the first vehicle 12 to execute a steering command based on the sensor system 16 detecting an object 20 within a travel path of the second vehicle 14 as the second vehicle 14 tows the first vehicle 12. For purposes of this disclosure, the term "front vehicle" can refer to the second vehicle 14, and the term "rear vehicle" can refer to the first vehicle 12.

With reference to the embodiment shown in FIG. 1, the rear vehicle 12 is a sport utility vehicle (SUV) embodiment that is equipped with the operation assistance system 10 for monitoring and/or controlling the path of the front vehicle 14 that is attached to and that propels the rear vehicle 12. Specifically, the rear vehicle 12 is pivotally attached to one embodiment of the front vehicle 14, which is exemplified as a recreational vehicle (RV), at a rear side of the front vehicle 14. In the embodiment illustrated in FIG. 1, a connection member 30 is coupled to the rear vehicle 12 at a front side of the rear vehicle 12, and the connection member 30 includes a coupler assembly 32 that latches onto a hitch ball 34 coupled to the front vehicle 14 at the rear side of the front vehicle 14. The coupler assembly 32 latched onto the hitch ball 34 provides a pivoting ball joint connection 36 that allows for articulation of the hitch angle between the rear and front vehicles 12, 14. In the illustrated embodiment, the rear and front vehicles 12, 14 are front-wheel steering vehicles. In other words, the steerable wheels 38 of the rear and front vehicles 12, 14 are associated with front axles 40 rather than the rear axles 42 of the rear and front vehicles 12, 14. Further, the rear vehicle 12 is coupled to the front vehicle 14, such that forward movement of the front vehicle 14 causes the rear vehicle 12 to be towed behind the front vehicle 14, and rearward movement of the front vehicle 14 causes the rear vehicle 12 to be pushed in a rearward direction by the front vehicle 14. It should be appreciated that additional embodiments of the rear and/or front vehicles 12, 14 may include various numbers of axles, may have various shapes and sizes, may have various steering configurations, and/or may be coupled to each other in a variety of manners.

Figure 2:
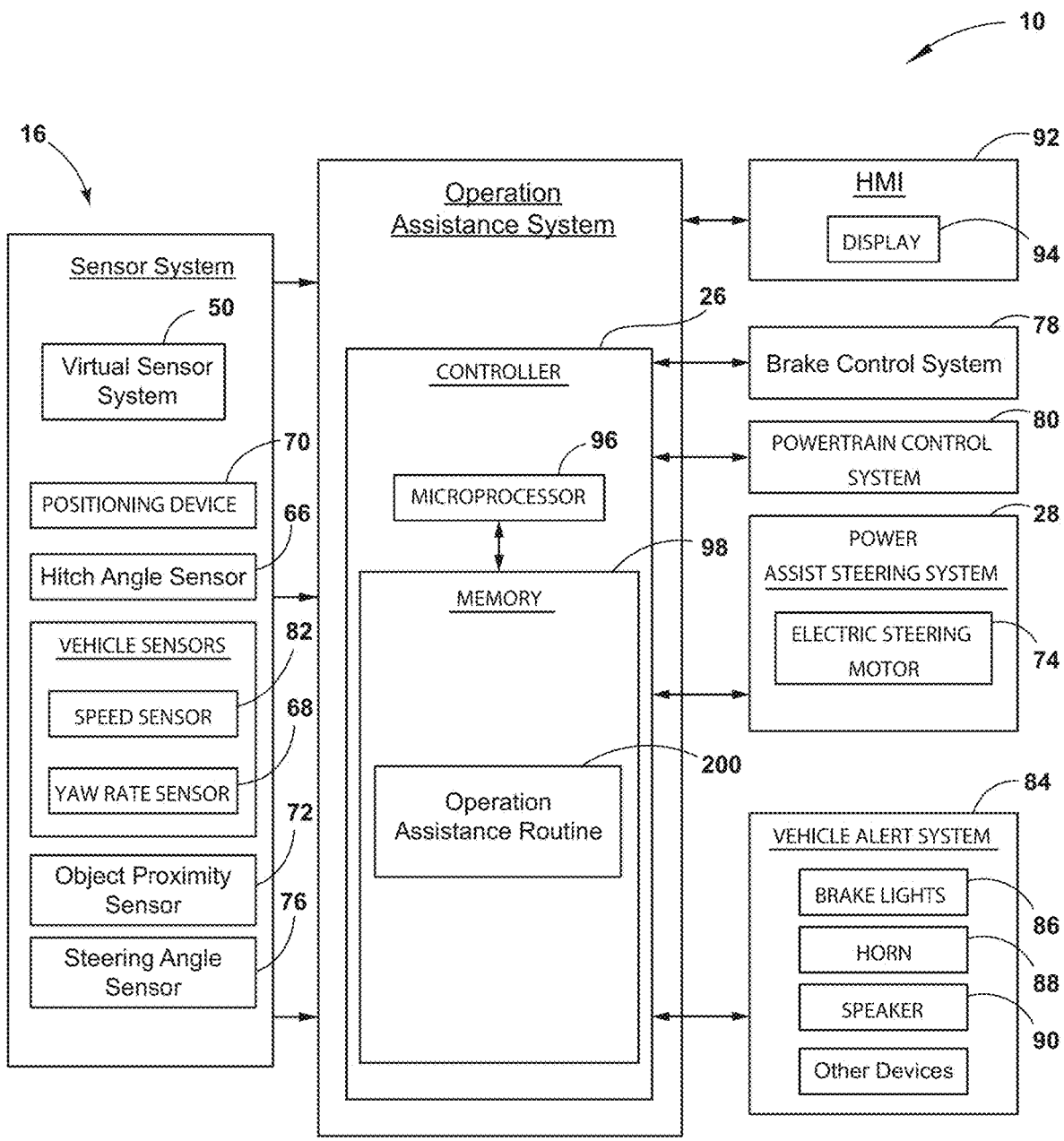
FIG. 2 is a block diagram illustrating an operation assistance system, having a sensor system, a controller, and various other vehicle systems.

Referring now to FIG. 2, the rear vehicle 12 may include a sensor system 16 having a plurality of sensors configured to detect the feature 18 in the operating environment 24 of the rear and/or front vehicle 12, 14. The plurality of sensors may include one or a combination of visual sensors (e.g., cameras, surround view cameras, etc.), radar sensors, Lidar sensors, ultrasonic sensors, lasers, thermal sensors, and/or various other sensors. For example, in some embodiments, the rear vehicle 12 may include ultrasonic sensors, surround view cameras, radar sensors disposed on the corners and front of the rear vehicle 12, and cameras on the front side and rear side of the rear vehicle 12. It is contemplated that the plurality of sensors in the sensor system 16 may be located in various positions on the rear vehicle 12. It is further contemplated that, in some embodiments, one or more of the plurality of sensors of the sensor system 16 of the rear vehicle 12 may be coupled to the front vehicle 14, in addition to the one or more sensors coupled to the rear vehicle 12.

The sensor system 16 may be in communication with the controller 26 (i.e., may be configured to provide sensed inputs to the controller 26). In various embodiments, the data collected from the plurality of sensors in the sensor system 16 may be utilized by the controller 26 to map the features 18 detected within the operating environment 24 of the rear and/or front vehicle 12, 14. The features 18 detected within the operating environment 24 of the rear vehicle 12 may include, but are not limited to, the front vehicle 14, objects 20, such as moving and stationary objects 20 (e.g., other vehicles V, pedestrians, etc.), and/or lane boundaries 22, such as lines or other indicia defining driving lanes 44 on a road and/or lines or other indicia designating parking spaces 46, within a prescribed distance of the rear vehicle 12 and/or the front vehicle 14.

Figure 3:
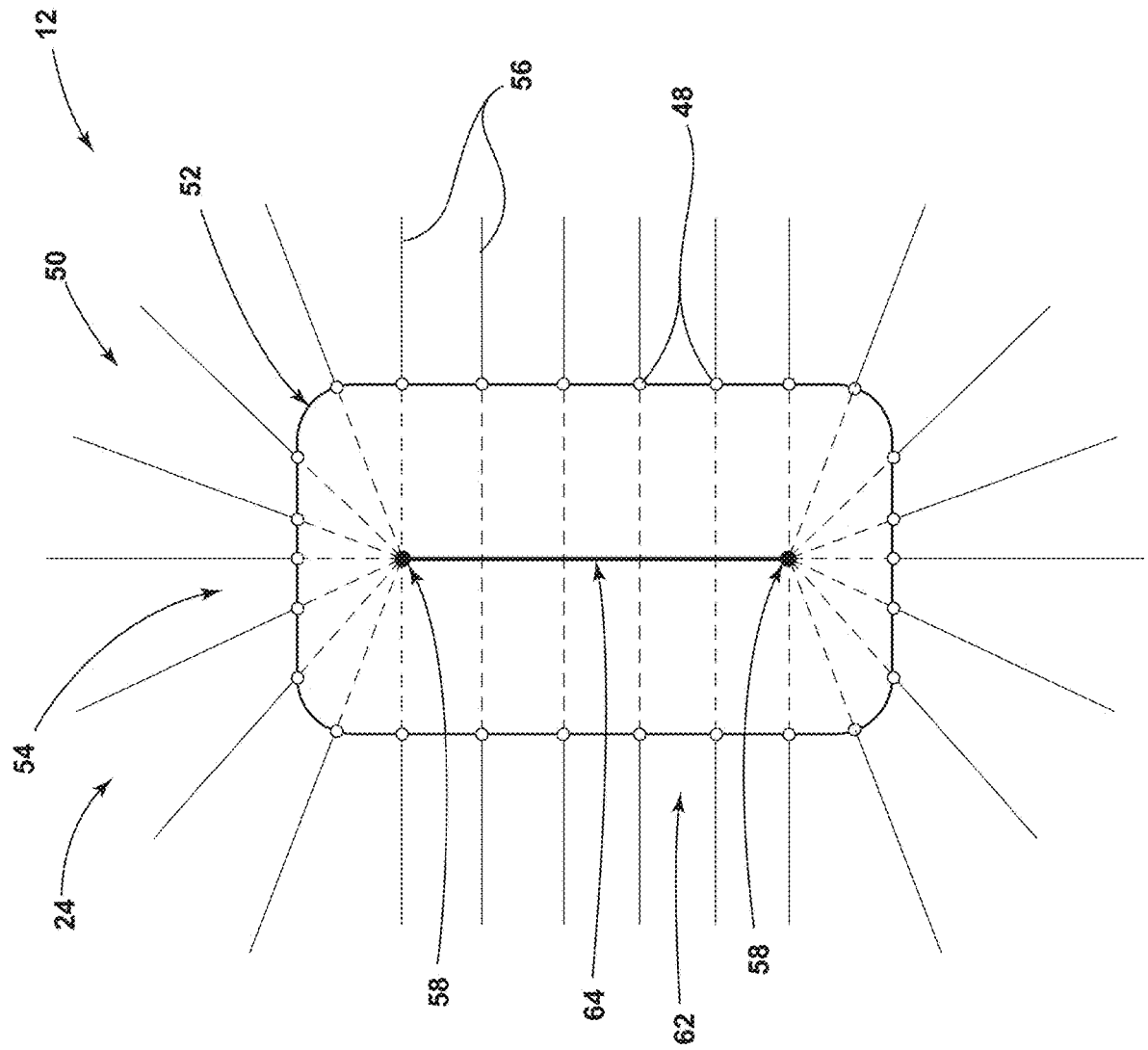
FIG. 3 is a top-down representation of spatial segmentation of an operating environment of a vehicle output by a virtual sensor system.

Referring now to FIG. 3, in some embodiments, the data collected from two or more sensor types (e.g., visual, radar, ultrasonic) may be fused (sensor fusion) to provide virtual sensors 48 positioned on the rear vehicle 12. A virtual sensor system 50 may result from the fusion of the various sensor inputs and may be configured to output a spatial segmentation of the operating environment 24 of the rear vehicle 12 and/or the front vehicle 14. In some embodiments, the spatial segmentation of the operating environment 24 of the rear and/or front vehicle 12, 14 may be output as a two-dimensional representation of the operating environment 24 of the rear and/or front vehicle 12, 14 from a top-down perspective. For example, in the embodiment illustrated in FIG. 3, a two-dimensional representation of the operating environment 24 of the rear vehicle 12 from a top-down perspective is shown. In operation, features 18 detected by the virtual sensor system 50 within the operating environment 24 of the rear vehicle 12 may be represented by a distance from the detected feature 18 to a delineated vehicle boundary 52. In some embodiments, the detected feature 18 may further be represented by the determined position of the feature 18 within a 2D world coordinate frame of the operating environment 24 of the rear and/or front vehicle 12, 14. In various embodiments, the delineated vehicle boundary 52 may generally trace the contour of the exterior of the rear vehicle 12 from a top-down perspective, as shown in FIG. 3. However, it is contemplated that the delineated vehicle boundary 52 may deviate from the literal boundary of the rear vehicle 12 and/or may encompass at least a portion of the literal boundary of the front vehicle 14 by design.

In various embodiments, the spatial segmentation of the operating environment 24 of the rear and/or front vehicle 12, 14 may include a variety of segment types. For example, as shown in FIGS. 3 and 4A, the spatial segmentation may include point-based segments 54 that are defined by lower and upper boundary vectors 56 originating from a common reference point 58. In various embodiments, the common reference point 58 may be disposed within the delineated vehicle boundary 52, and the upper and lower boundary vectors 56 may extend therefrom across the delineated vehicle boundary 52 into the operating environment 24 surrounding the rear and/or front vehicle 12, 14. However, it is contemplated that the common reference point 58 may be positioned proximate to the delineated vehicle boundary 52. The determined distance of the feature 18 detected within the point-based segment 54 from the delineated vehicle boundary 52 may be defined by the Euclidean distance between the nearest detected point of the feature 18 and the delineated vehicle boundary 52 along a line 60A between the common reference point 58 and the nearest detected point of the feature 18.

Figure 4B:
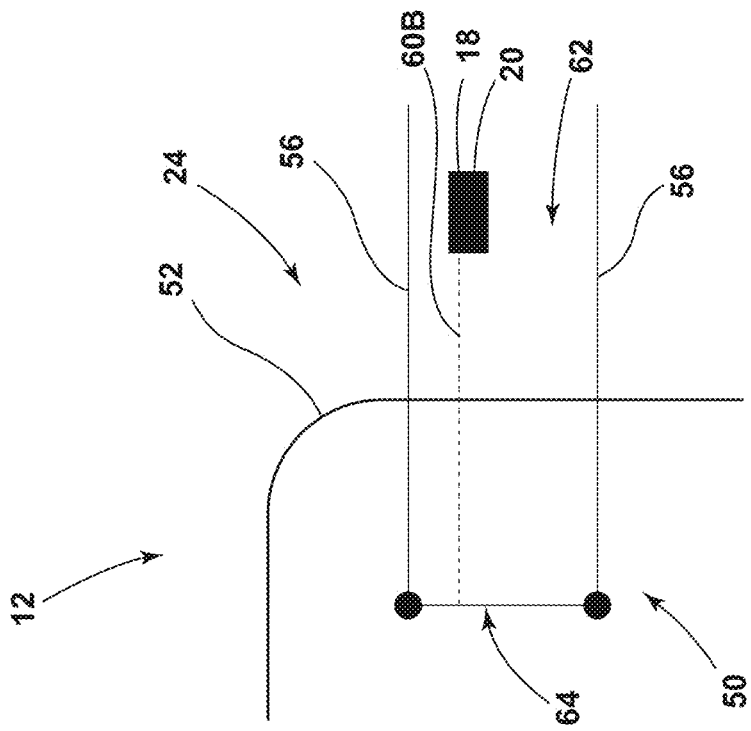
FIG. 4B is a top-down representation of a portion of the spatial segmentation output by the virtual sensor system, illustrating the object between upper and lower boundary vectors of a line-based segment.
Figure 4A:
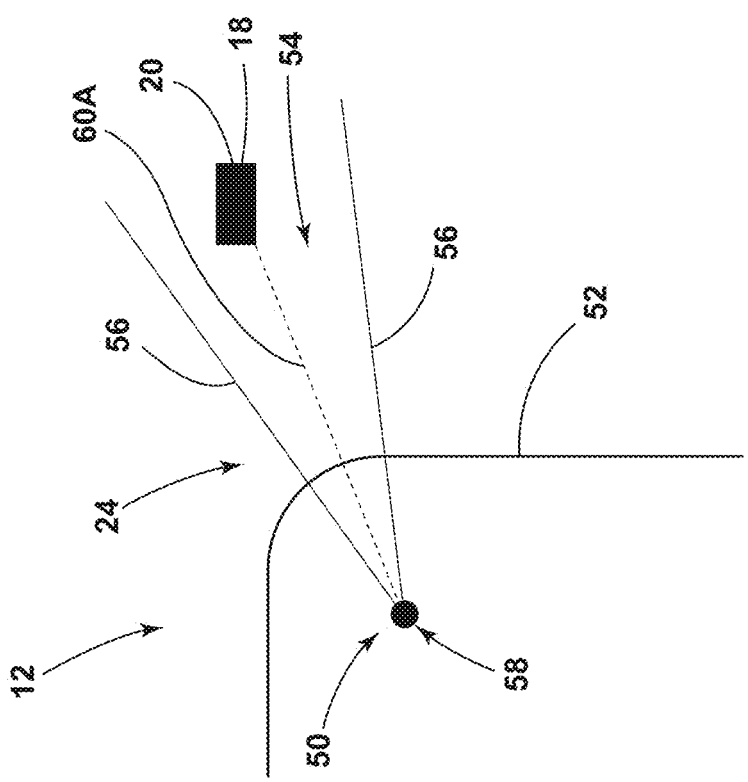
FIG. 4A is a top-down representation of a portion of the spatial segmentation output by the virtual sensor system, illustrating an object between upper and lower boundary vectors of a point-based segment.

Referring now to FIGS. 3 and 4B, the spatial segmentation may further include line-based segments 62 that are defined by lower and upper boundary vectors 56 extending from points on a common reference line 64. The determined distance of the feature 18 detected within the line-based segment 62 from the delineated vehicle boundary 52 may be defined by the Euclidean distance between the nearest detected point of the feature 18 and the delineated vehicle boundary 52 along a line 60B between the nearest point on the common reference line 64 and the nearest detected point of the feature 18. It is contemplated that, in various embodiments, the rear vehicle 12 may include a plurality of common reference points 58 and/or common reference lines 64 from which boundary vectors 56 extend to define respective segments, as may be suitable to tailor the segments of the virtual sensor system 50 to the contours of a given delineated vehicle boundary 52.

In various embodiments, the virtual sensor system 50 may be utilized by the operation assistance system 10 to identify and characterize features 18 within the operating environment 24 of the rear vehicle 12 and/or the front vehicle 14. For example, in some embodiments, the virtual sensor system 50 may provide information to operation assistance system 10 regarding characteristics of the front vehicle 14, and/or the hitch angle between the rear vehicle 12 and the front vehicle 14, as well as the delineated vehicle boundary 52 of the rear and/or front vehicle 12, 14, lane boundaries 22, and moving or stationary objects 20 within the operating environment 24 of at least one of the rear vehicle 12 and the front vehicle 14. In some implementations, the furthest lateral points of the front vehicle 14 detected by the virtual sensor system 50 may provide a front vehicle width estimate. In some embodiments, in which the position of the corners of the front vehicle 14 are determined, front vehicle width may be defined by the Euclidean distance between the determined corners. Further, in this embodiment, the hitch angle may be defined by the angle between the rear vehicle 12 and a line normal to a vector extending between the determined corner positions of the front vehicle 14. It is contemplated that the virtual sensor system 50 may determine rear vehicle 12, front vehicle 14, and other feature 18 parameters in addition to those discussed herein. Additionally, as described further herein, it is contemplated that the sensor system 16 may determine various feature characteristics (e.g., front vehicle 14 attributes, hitch angle, the position of the vehicle V, position of lane boundaries 22, position and/or path of objects 20) of features 18 within the operating environment 24 of at least one of the rear vehicle 12 and the front vehicle 14 by means other than the virtual sensor system 50 described herein.

For example, with respect to determining a hitch angle, in some embodiments, the sensor system 16 may include a vision based hitch angle sensor 66 for sensing the hitch angle between the rear vehicle 12 and the front vehicle 14. Furthermore, it is contemplated that additional embodiments of the hitch angle sensor 66 and the sensor system 16 for providing the hitch angle may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 36, a yaw rate sensor 68 on the front vehicle 14 and the rear vehicle 12, energy transducers of a drive aid system, a blind spot system, and/or a cross traffic alert system, and other conceivable sensors or indicators of the hitch angle to supplement or be used in place of the vision based hitch angle sensor 66.

Further, with respect to determining the position of the rear vehicle 12, in some embodiments, the operation assistance system 10 may receive vehicle status-related information from additional sensors and devices. This information may include positioning information from a positioning device 70, which may include a global positioning system (GPS) on the rear vehicle 12 or a handheld device, to determine a coordinate location of the rear vehicle 12 and the front vehicle 14 based on the location of the positioning device 70 with respect to the front vehicle 14 and/or the rear vehicle 12 and based on the sensed hitch angle. The positioning device 70 may additionally or alternatively include a dead reckoning system for determining the coordinate location of the rear vehicle 12 and the front vehicle 14 within a localized coordinate system based at least on vehicle speed of the rear and/or front vehicle 12, 14, steering angle δ of the rear and/or front vehicle 12, 14, and hitch angle. Other vehicle information received by the operation assistance system 10 may include a speed of the rear vehicle 12 and/or the front vehicle 14 from a speed sensor 82 and a yaw rate of the rear vehicle 12 and/or front vehicle 14 from the yaw rate sensor 68. With respect to detecting potential obstacles, in some embodiments, the sensor system 16 of the operation assistance system 10 may include an object proximity sensor 72 that provides the proximity of an object 20 to the controller 26 of the operation assistance system 10.

Referring now to FIG. 2, in some embodiments, the operation assistance system 10 is in communication with a power assist steering system 28 of the rear vehicle 12 to operate the steered wheels 38 (FIG. 1) of the rear vehicle 12 for moving the rear vehicle 12 in such a manner that the front vehicle 14 reacts in accordance with the desired path of the front vehicle 14. In some embodiments, the power assist steering system 28 may be an electric power-assisted steering (EPAS) system that includes an electric steering motor 74 for turning the steered wheels 38 to a steering angle δ based on a steering command, whereby the steering angle δ may be sensed by a steering angle sensor 76 of the power assist steering system 28. The steering command may be provided by the operation assistance system 10 for autonomously steering the steered wheels 38 of the rear vehicle 12 based on the sensor system 16 detecting the feature 18 in the operating environment 24 of at least one of the rear vehicle 12 and the front vehicle 14.

Referring further to FIG. 2, the power assist steering system 28 provides the controller 26 of the operation assistance system 10 with information relating to a rotational position of the steered wheels 38 of the rear vehicle 12, including the steering angle δ. In some embodiments, the controller 26 may process the current steering angle δ, in addition to other rear vehicle 12 and front vehicle 14 conditions, to determine vehicle actions. It is conceivable that the operation assistance system 10, in additional embodiments, may be an integrated component of the power assist steering system 28. For example, the power assist steering system 28 may include an operation assistance algorithm for generating vehicle steering information and commands as a function of all or a portion of information received from the sensor system 16, power assist steering system 28, a vehicle brake control system 78, a powertrain control system 80, and/or other sensors and devices of the rear and front vehicles 12, 14.

In further reference to FIG. 2, the vehicle brake control system 78 may also communicate with the controller 26 to provide the operation assistance system 10 with braking information, such as vehicle wheel speed, and to receive braking commands from the controller 26. For instance, vehicle speed information can be determined from individual wheel speeds as monitored by the brake control system 78. Vehicle speed may also be determined from the powertrain control system 80, the speed sensor 82, and the positioning device 70, among other conceivable means. In some embodiments, individual wheel speeds can also be used to determine a vehicle yaw rate, which can be provided to the operation assistance system 10 in the alternative or in addition to the vehicle yaw rate sensor 68. In certain embodiments, the operation assistance system 10 can provide vehicle braking information to the brake control system 78 for allowing the operation assistance system 10 to control braking of the rear vehicle 12 while the front vehicle 14 propels the rear vehicle 12. For example, the operation assistance system 10, in some embodiments, may regulate speed of the rear vehicle 12 and the front vehicle 14 while the rear and front vehicles 12, 14 are turning or when one or more features 18 are detected, which can assist in operating the vehicle combination, as will be further discussed below.

The powertrain control system 80, as shown in the embodiment illustrated in FIG. 2, may also interact with the operation assistance system 10 for regulating speed and acceleration of the rear vehicle 12 and/or the front vehicle 14, while the front vehicle 14 tows the rear vehicle 12 forward or pushes the rear vehicle 12 in reverse.

With continued reference to FIG. 2, the operation assistance system 10 in the illustrated embodiment may communicate with one or more devices, including a vehicle alert system 84, which may prompt visual, auditory, and/or tactile warnings signals. For instance, vehicle brake lights 86 and vehicle emergency flashers may provide a visual alert and a vehicle horn 88 and/or speaker 90 may provide an audible alert. Additionally, the operation assistance system 10 and/or the vehicle alert system 84 may communicate with a human machine interface (HMI) 92 of the rear vehicle 12 and/or the front vehicle 14. The HMI 92 may include a vehicle display 94, such as a center-stack mounted navigation or entertainment display. Further, the operation assistance system 10 may communicate via wireless communication with another embodiment of the HMI 92, such as with one or more handheld or portable devices, including one or more smartphones. The portable device may also include the display 94 for displaying one or more images, such as live video taken by cameras of the rear vehicle 12, and other information to a user. In addition, the portable device may provide feedback information, such as warning signals that are visual, audible, tactile, and/or a combination thereof.

As further illustrated in FIG. 2, the controller 26 is configured with a microprocessor 96 to process logic and routines stored in memory 98 that receive information from the sensor system 16, the power assist steering system 28, the vehicle brake control system 78, the vehicle alert system 84, the powertrain control system 80, and other vehicle sensors and devices. The controller 26 may generate warnings, as well as vehicle steering information and commands, as a function of all or a portion of the information received. Thereafter, the vehicle steering information and commands may be provided to the power assist steering system 28 for affecting steering of the rear vehicle 12. Additionally, the controller 26 may be configured to prompt one or more vehicle systems (e.g., vehicle alert system 84, vehicle brake control system 78, etc.) to execute one or more actions, as will be discussed in more detail in paragraphs below.

The controller 26 may include the microprocessor 96 and/or other analog and/or digital circuitry for processing one or more routines. Also, the controller 26 may include the memory 98 for storing one or more routines, including an operation assistance routine 200. It should be appreciated that the controller 26 may be a stand-alone dedicated controller 26 or may be a shared controller 26 integrated with other control functions, such as integrated with the sensor system 16, the power assist steering system 28, and other conceivable onboard or off-board vehicle control systems.

As described above herein, the operation assistance system 10 can be in communication with one or more of the above-mentioned systems of the rear vehicle 12, such as the controller 26, the sensor system 16, the power assist steering system 28, the powertrain control system 80, the vehicle alert system 84, and the brake control system 78. In various embodiments, the operation assistance system 10 can additionally be in communication with one or more of a host of systems of the front vehicle 14. In some embodiments, the front vehicle 14 may include one or more of a controller 26, a sensor system 16, a power assist steering system 28, a powertrain control system 80, a vehicle alert system 84, and a brake control system 78, as described above in reference to the rear vehicle 12. In an exemplary embodiment, the operation assistance system 10 incorporates controllers 26, sensor systems 16, and power assist steering systems 28 of both the rear and front vehicles 12, 14, such that the controllers 26 of at least one of the first and front vehicles 12, 14 may prompt the respective power assist steering systems 28 to execute steering commands based on at least one of the sensor systems 16 detecting the feature 18 in the operating environment 24 of at least one of the front vehicle 14 and the rear vehicle 12 propelled by the front vehicle 14. A variety of implementations are contemplated.

Referring now to FIG. 2, the controller 26 of the operation assistance system 10 may prompt one or more systems of at least one of the rear vehicle 12 and the front vehicle 14 to execute a vehicle action based on the sensor system 16 detecting the feature 18 in the operating environment 24 of at least one of the rear vehicle 12 and the front vehicle 14. In various embodiments, the controller 26 of the operation assistance system 10 may prompt execution of the vehicle action in response to determining a response condition based on the detection of the feature 18 by the sensor system 16 and at least one of a host of additional factors. In various embodiments, the host of factors may include, but is not limited to, operating factors, such as the dimensions of the rear and/or front vehicle 12, 14, signals from the rear and/or front vehicle 12, 14 (e.g., turn signal, etc.), driving mode of the rear and/or front vehicle 12, 14 (e.g., forward, reverse, neutral, etc.), the speed of the rear and/or front vehicle 12, 14, the heading direction of the rear and/or front vehicle 12, 14, the steering angle of the rear and/or front vehicle 12, 14, the hitch angle between the rear and front vehicles 12, 14, and/or the yaw rate of the rear and/or front vehicle 12, 14, and environmental factors, such as the number of features 18 detected, the type of feature 18 detected, the position of the feature 18 detected, velocity of the feature 18 detected, and/or the size of the feature 18 detected.

Figure 6:
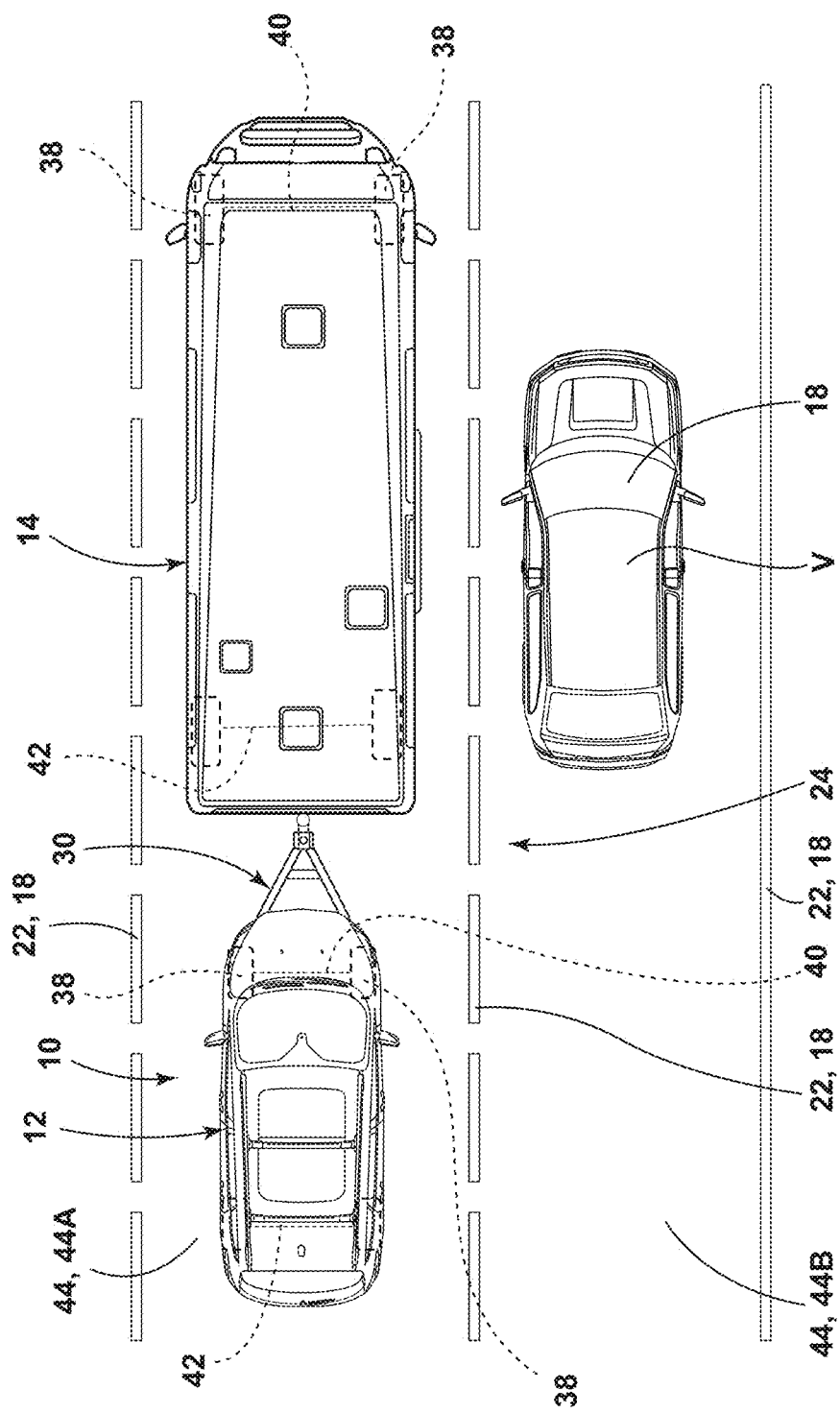
FIG. 6 is a plan view of the second vehicle towing the first vehicle within a driving lane with a vehicle positioned alongside the second vehicle.

The controller 26 may prompt execution of a vehicle action in response to determining at least one of a variety of response conditions based on one or more factors. For example, in some embodiments, the controller 26 may prompt execution of a vehicle action in response to determining that a feature 18 (e.g., object 20, vehicle V, lane boundary 22, pedestrian, etc.) is in the travel path of the rear vehicle 12 and/or the front vehicle 14 based on one or more operating and environmental factors. In some embodiments, the controller 26 may prompt execution of a vehicle action in response to determining that a feature 18, such as a vehicle V, is positioned alongside the rear and/or front vehicle 12, 14 and the travel path of the rear and/or front vehicle 12, 14 intersects with a feature 18, such as a lane boundary 22, between the vehicle V and the rear and/or front vehicle 12, 14, as illustrated in FIG. 6. In some embodiments, the controller 26 may prompt execution of a vehicle action in response to determining that a feature 18, such as a vehicle V, is positioned alongside the rear and/or front vehicle 12, 14, a lane boundary 22 is positioned between the vehicle V and the rear and/or front vehicle 12, 14, and a turn signal of the rear and/or front vehicle 12, 14 is activated. A variety of response conditions are contemplated.

Referring still to FIG. 2, the controller 26 of the operation assistance system 10 may prompt execution of a variety of vehicle actions from various vehicle systems in response to determining the response condition based on the one or more factors. For example, the controller 26 may prompt execution of an alert signal by the vehicle alert system 84, execution of a steering command by the power assist steering system 28, execution of a maneuver by the powertrain control system 80, and/or execution of a braking command by the brake control system 78, in response to determining the response condition.

Figure 5:
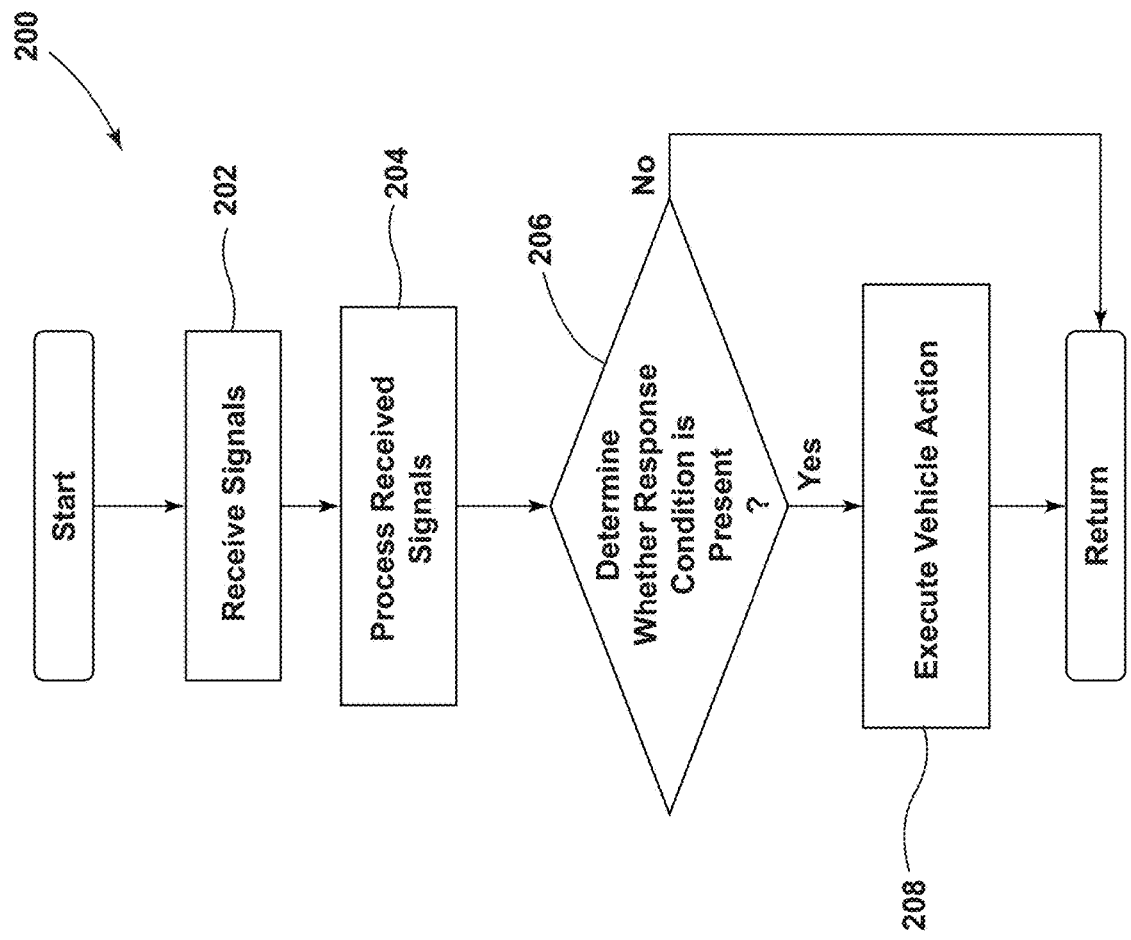
FIG. 5 is a flow diagram illustrating an operation assistance routine.

Referring now to FIG. 5, an embodiment of the operation assistance routine 200 for use in the operation assistance system 10 is illustrated. In the illustrated embodiment, the operation assistance routine 200 begins with the step 202 of receiving signals. The controller 26 may receive signals from the sensor system 16 of at least one of the rear vehicle 12 and the front vehicle 14. In various embodiments, the step 202 of receiving signals may further include receiving signals from a variety of other systems of the rear vehicle 12 and/or the front vehicle 14. For example, the step 202 of receiving signals may include receiving signals, such as a turn signal input, from the vehicle alert system 84 of the rear vehicle 12 and/or the front vehicle 14 indicating that a turn signal of at least one of the rear vehicle 12 and the front vehicle 14 is activated. In some embodiments, the step 202 of receiving signals may include receiving signals from the HMI 92 of the rear vehicle 12, front vehicle 14, or the portable device HMI 92. Further, it is contemplated that the step 202 of receiving signals may entail receiving signals from other sources, additionally or alternatively, such as from other vehicles V in the form of vehicle-to-vehicle communications, or various other features 18 (e.g., V2X communications). The signals received may relate to and/or be indicative of one or more environmental factors, operating factors, and/or other conditions relating to the rear vehicle 12, the front vehicle 14, and/or one or more features 18. For example, in various embodiments, the step 202 of receiving signals may include the controller 26 receiving signals from the sensor system 16 of the rear vehicle 12 that relay detection of the feature 18 by the sensor system 16.

After the step 202 of receiving the signals, the received signals are processed by the controller 26 at step 204. The step 204 of processing the received signals may include processing data received from the sensor system 16 via the signals to determine one or more environmental factors and/or operating factors. For example, the step 204 of processing the received signals may include processing data received from the sensor system 16 to determine the hitch angle between the rear vehicle 12 and the front vehicle 14, and the position of an object 20 detected by the sensor system 16 alongside the rear vehicle 12.

At step 206, the controller 26 determines whether a response condition is present based on the processed signals. In various embodiments, the controller 26 determines whether a response condition is present based on one or more of the environmental factors and/or operating factors. In some implementations, the sensor system 16 detecting the feature 18 in the operating environment 24 of at least one of the rear vehicle 12 and the front vehicle 14 is at least one of the factors that contributes to the controller 26 determining that a response condition is present. As described herein, a variety of response conditions are contemplated. If, at step 206, the controller 26 determines that a response condition is not present, the operation assistance routine 200 may conclude or return to the beginning and start again, as illustrated in FIG. 5. If, instead, the controller 26 determines that a response condition is present, the operation assistance routine 200 proceeds to the step 208 of executing a vehicle action.

At step 208, the controller 26 prompts one or more systems of the rear vehicle 12 and/or front vehicle 14 to execute a vehicle action, and the one or more systems execute the vehicle action. As described herein, various systems of the rear vehicle 12 and/or the front vehicle 14 may execute the vehicle action. For example, with respect to the rear vehicle 12 and/or the front vehicle 14, the vehicle alert system 84 may execute an alert signal, the power assist steering system 28 may execute a steering command, the powertrain control system 80 may execute a maneuver, and/or the brake control system 78 may execute a braking command. Subsequently, the operation assistance routine 200 concludes or begins again. In various embodiments, the operation assistance routine 200 may be performed when the rear vehicle 12 is coupled to the front vehicle 14 and the front vehicle 14 is propelling itself and the rear vehicle 12. For example, in some embodiments, the operation assistance routine 200 may be performed when the rear vehicle 12 is coupled to the front vehicle 14, and the front vehicle 14 is towing the rear vehicle 12. Further, in some embodiments, the operation assistance routine 200 may be performed when the rear vehicle 12 is coupled to the front vehicle 14, and the front vehicle 14 is pushing the rear vehicle 12 while reversing.

In an exemplary embodiment of the operation assistance system 10, the rear vehicle 12 is a front wheel steering vehicle 12, rather than a rear wheel steering or front and rear wheel steering vehicle. Further, the front vehicle 14 is a front wheel steering vehicle 14, rather than a rear wheel steering or front and rear wheel steering vehicle. The rear vehicle 12 is positioned vehicle-rearward of the front vehicle 14, and the front side of the rear vehicle 12 is coupled to the rear side of the front vehicle 14 via the connection member 30 extending therebetween, as illustrated in FIG. 1. The rear vehicle 12 is equipped with the vehicle alert system 84, the power assist steering system 28, the sensor system 16, and the controller 26. The vehicle alert system 84 includes a portable device, which is utilized as the HMI 92. The front vehicle 14 is electrically connected to the rear vehicle 12 to coordinate brake lights, and turn signal lights, but the front vehicle 14 does not include the sensor system 16 that is operable to detect features 18 in the operating environment 24 of the rear vehicle 12 or the front vehicle 14.

In operation of the exemplary embodiment, a driver of the front vehicle 14 is driving forward, such that the rear vehicle 12 is towed behind the front vehicle 14, as illustrated in FIG. 1. The portable device HMI 92 is within a cabin of the front vehicle 14, such that warning signals from the vehicle alert system 84 can be received by the driver of the front vehicle 14 via the HMI 92. While the rear vehicle 12 is being towed, the sensor system 16 of the rear vehicle 12 is operated to detect one or more features 18 in the operating environment 24 of the rear vehicle 12 and/or the front vehicle 14. As illustrated in FIG. 6, a vehicle V is positioned along the right side of the front vehicle 14, ahead of the rear vehicle 12. The sensor system 16 of the rear vehicle 12 detects the vehicle V positioned alongside the front vehicle 14. While the vehicle V is positioned as such, the right turn signal of the front vehicle 14 is activated by the driver, which activates the right turn signal of the rear vehicle 12. The activation of the right turn signal and the detection of the vehicle V along the right side of the front vehicle 14 by the sensor system 16 of the rear vehicle 12 is relayed to the controller 26. The controller 26 determines that a first response condition exists based on the combination of the detected vehicle V and the activated turn signal. In response to the determined first response condition, the controller 26 prompts the portable device HMI 92 within the cabin of the front vehicle 14 to output a visual and tactile warning signal to alert the driver of the presence of vehicle V in the blind spot of the front vehicle 14.

Figure 7:
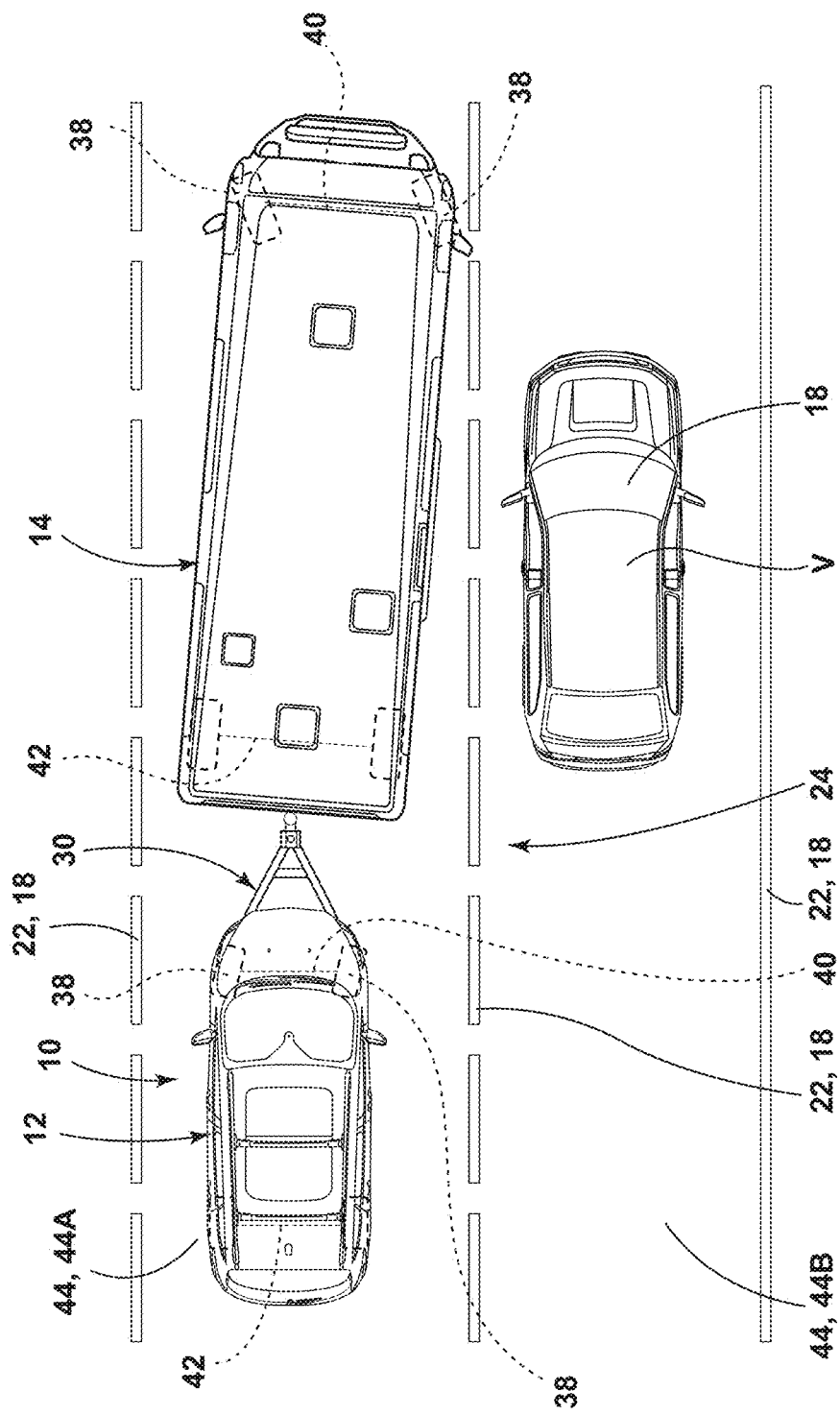
FIG. 7 is a plan view of the second vehicle towing the first vehicle within the driving lane with the vehicle positioned alongside the second vehicle, illustrating steered wheels of the first vehicle turned toward the vehicle.

Next, based on a variety of operating and environmental factors indicating that the front vehicle 14 is merging into the right lane 44B where the detected vehicle V is present (i.e., the warning signal was not heeded by the driver of the front vehicle 14), the controller 26 determines that a second response condition exists. In response to the determined second response condition, the controller 26 prompts the power assist steering system 28 of the rear vehicle 12 to execute a steering command to turn the steered wheels 38 of the rear vehicle 12 to the right, toward the lane boundary 22 and vehicle V positioned alongside the front vehicle 14, as illustrated in FIG. 7. Steering the front, steered wheels 38 of the towed rear vehicle 12 to the right causes a yawing motion of the front vehicle 14, which forces the rear side of the front vehicle 14 to the right, and, in turn, causes the front steered wheels 38 of the front vehicle 14 to turn to the left, away from the vehicle V, as illustrated in FIG. 7. With the front steered wheels 38 of the front vehicle 14 turned to the left, the front vehicle 14 and the trailing rear vehicle 12 are prevented from crossing the lane boundary 22 between the left and right driving lanes 44A, 44B and a collision with the vehicle V is avoided.

In another exemplary embodiment of the operation assistance system 10, the rear vehicle 12 is a front wheel steering vehicle 12, and the front vehicle 14 is a front wheel steering vehicle 14. The rear vehicle 12 is positioned vehicle-rearward of the front vehicle 14, and the front side of the rear vehicle 12 is coupled to the rear side of the front vehicle 14 via the connection member 30 extending therebetween, as illustrated in FIG. 1. The rear vehicle 12 is equipped with the vehicle alert system 84, the power assist steering system 28, the sensor system 16, and the controller 26. The vehicle alert system 84 includes a portable device, which is utilized as the HMI 92. The front vehicle 14 is electrically connected to the rear vehicle 12 to coordinate brake lights, and turn signal lights, but the front vehicle 14 does not include the sensor system 16 that is operable to detect features 18 in the operating environment 24 of the rear vehicle 12 or the front vehicle 14.

Figure 8:
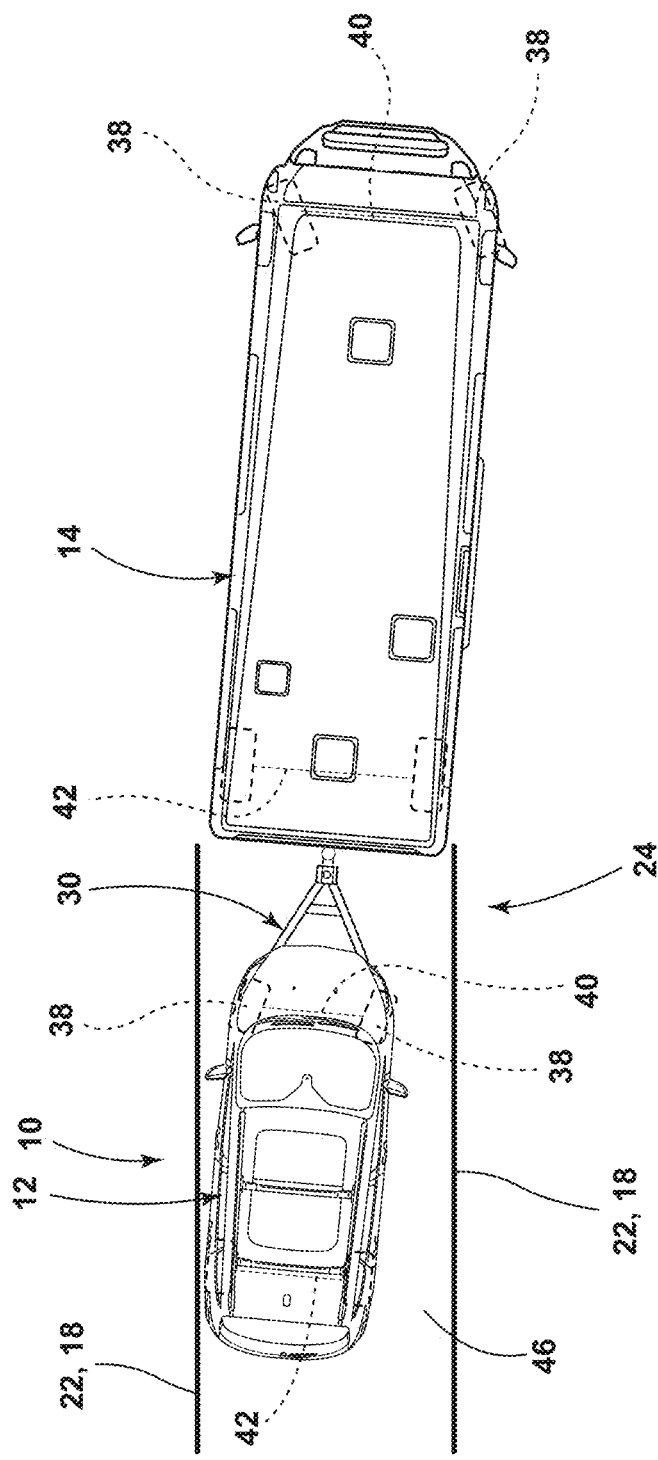
FIG. 8 is a plan view of the second vehicle pushing the first vehicle into a parking space while reversing, illustrating steered front wheels of the first vehicle turned away from the lane boundary on a left side of the first vehicle.

In operation of the exemplary embodiment, a driver of the front vehicle 14 drives in reverse, such that the rear vehicle 12 is pushed in a rearward direction behind the front vehicle 14, as illustrated in FIG. 8, with the goal of parking the rear and front vehicles 12, 14 within a parking space 46 delineated by two parking space lane boundaries 22. While the rear vehicle 12 is propelled in reverse, the sensor system 16 of the rear vehicle 12 is operated to detect one or more features 18 in the operating environment 24 of the rear vehicle 12 and/or the front vehicle 14. As illustrated in FIG. 8, the front vehicle 14 is oriented such that continued straight rearward movement of the rear and front vehicles 12, 14 would cause the rear vehicle 12 to cross the lane boundary 22 on the left side of the rear vehicle 12. The sensor system 16 of the rear vehicle 12 detects the position of the lane boundary 22 as well as the heading direction of the rear vehicle 12. Based on these signals from the sensor system 16, the controller 26 determines that a response condition exists. In response to the determined response condition, the controller 26 prompts the power assist steering system 28 of the rear vehicle 12 to execute a steering command to turn the steered wheels 38 of the rear vehicle 12 to the right, away from the left lane boundary 22, as illustrated in FIG. 8. Steering the front, steered wheels 38 of the rear vehicle 12 to the right causes a yawing motion of the front vehicle 14, which causes the front steered wheels 38 of the front vehicle 14 to turn to the left, away from the left lane boundary 22, as illustrated in FIG. 8. With the front wheels of the front vehicle 14 turned to the left, the front vehicle 14 and the rear vehicle 12 are generally prevented from crossing the left lane boundary 22 of the parking space 46, which aid the driver in aligning the rear and front vehicles 12, 14 within the parking space 46.

Figure 9:
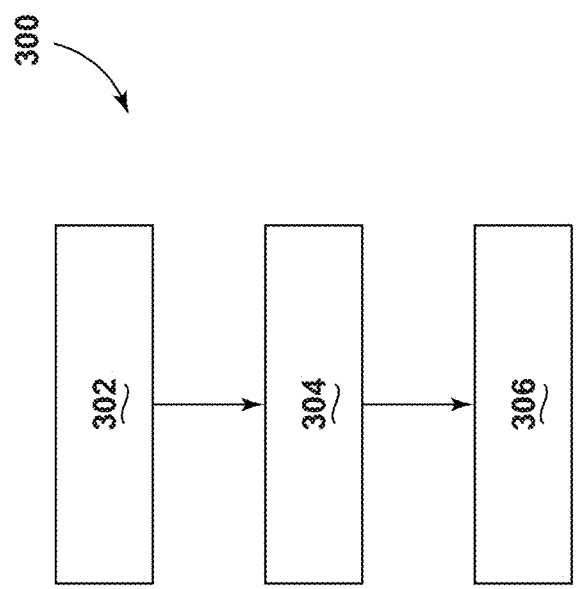
FIG. 9 is a block diagram illustrating a method of operating the operation assistance system, according to one embodiment.

Referring now to FIG. 9, a method 300 of operating the operation assistance system 10 is illustrated. The method includes the step 302 of propelling the rear vehicle 12 with the front vehicle 14. In some embodiments, the step 302 of propelling the rear vehicle 12 with the front vehicle 14 comprises towing the rear vehicle 12 with the front vehicle 14, as illustrated in FIGS. 6 and 7. In some embodiments, the step 302 of propelling the rear vehicle 12 with the front vehicle 14 comprises pushing the rear vehicle 12 with the front vehicle 14 while reversing the front vehicle 14, as illustrated in FIG. 8.

Referring still to FIG. 9, the method 300 may include the step 304 of detecting a feature 18 within the operating environment 24 of at least one of the rear vehicle 12 and the front vehicle 14. In various embodiments, the step 304 of detecting the feature 18 within the operating environment 24 of at least one of the rear vehicle 12 and the front vehicle 14 may be performed with the sensor system 16 of the rear vehicle 12. It is contemplated that the step 304 may be performed via the sensor system 16 of the rear vehicle 12 and/or the front vehicle 14, in some embodiments. As described herein, the sensor system 16 may detect at least one of a host of types of features 18 that may include, but is not limited to, lane boundaries 22, objects 20, vehicles V, and/or a combination thereof.

The method 300 may further include the step 306 of executing a vehicle action. In various embodiments at least one of a variety of systems of the rear vehicle 12 and/or the front vehicle 14 may execute the vehicle action. For example, the vehicle action may be executed by the vehicle alert system 84, the power assist steering system 28, the powertrain control system 80, and/or the brake control system 78. In some embodiments, the step 306 of executing the vehicle action may comprise controlling steering of the rear vehicle 12 with the power assist steering system 28 of the rear vehicle 12. In various implementations, the step 306 of executing the vehicle action may be based on and/or in response to the sensor system 16 detecting the feature 18 in the operating environment 24 of at least one of the rear vehicle 12 and the front vehicle 14. For example, the step 306 of executing the vehicle action may include controlling the steering of the rear vehicle 12 with the power assist steering system 28 of the rear vehicle 12 based on the sensor system 16 detecting the feature 18. In various examples, the step 306 of executing the vehicle action may include steering the front wheels of the rear vehicle 12 away from the feature 18 detected by the sensor system 16. It is contemplated that the step 306 of executing the vehicle action may include steering the front wheels of the rear vehicle 12 toward the feature 18 detected by the sensor system 16, in some embodiments.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An operation assistance system for a first vehicle that is connected to a second vehicle, wherein the second vehicle propels the first vehicle, comprising:
   a sensor system of the first vehicle that detects a feature in an operating environment of at least one of the first vehicle and the second vehicle; and
   a controller that is in communication with the sensor system and that prompts a power assist steering system of the first vehicle to execute a steering command based on the sensor system detecting the feature, wherein the controller prompts execution of the steering command based on the sensor system detecting the feature as the second vehicle tows the first vehicle.

2. The operation assistance system of claim 1, wherein execution of the steering command comprises steering the first vehicle toward the feature.

3. The operation assistance system of claim 1, wherein the controller prompts execution of the steering command based on the sensor system detecting the feature and a turn signal input of at least one of the first vehicle and the second vehicle.

4. The operation assistance system of claim 1, wherein the controller prompts execution of the steering command based on the sensor system detecting the feature alongside of the second vehicle and ahead of the first vehicle.

5. The operation assistance system of claim 1, wherein the feature is one of a vehicle and a lane boundary.

6. A method of operating an operation assistance system of a first vehicle, comprising the steps of:
   towing the first vehicle via a second vehicle;
   detecting a feature within an operating environment of at least one of the first vehicle and the second vehicle with a sensor system of the first vehicle; and
   controlling steering of the first vehicle with a steering system of the first vehicle based on the sensor system detecting the feature as the second vehicle tows the first vehicle.

7. The method of claim 6, wherein the step of controlling steering of the first vehicle based on the sensor system detecting the feature comprises steering front wheels of the first vehicle toward the feature.

8. The method of claim 6, wherein the step of controlling steering of the first vehicle based on the sensor system detecting the feature comprises steering front wheels of the first vehicle away from the feature.

9. The method of claim 6, wherein the feature is one of a vehicle and a lane boundary.

10. An operation assistance system for a first vehicle with front-wheel steering that is towed by a second vehicle with front-wheel steering, comprising:
- a sensor system of the first vehicle that detects a feature in an operating environment of at least one of the first vehicle and the second vehicle while the second vehicle tows the first vehicle; and
- a controller that is in communication with the sensor system and that prompts a power steering system of the first vehicle to execute a steering command based on the sensor system detecting the feature while the second vehicle tows the first vehicle.

11. The operation assistance system of claim 10, wherein the sensor system of the first vehicle detects the feature along a right side of at least one of the first vehicle and the second vehicle, and wherein execution of the steering command comprises steering the first vehicle to the right toward the feature to cause front wheels of the second vehicle to steer away from the feature.

12. The operation assistance system of claim 10, wherein the feature is one of a vehicle and a lane boundary.

\* \* \* \* \*